(12) United States Patent
Berrux

(10) Patent No.: US 10,806,296 B2
(45) Date of Patent: Oct. 20, 2020

(54) CULINARY UTENSIL PROVIDED WITH A HYBRID COATING AND PROCESS FOR PRODUCING SUCH A UTENSIL

(71) Applicant: SEB S.A., Ecully (FR)

(72) Inventor: Aurélien Berrux, La Motte Servolex (FR)

(73) Assignee: SEB S.A. (FR)

( * ) Notice: Subject to any disclaimer, the term of this patent is extended or adjusted under 35 U.S.C. 154(b) by 158 days.

(21) Appl. No.: 15/102,668

(22) PCT Filed: Dec. 11, 2014

(86) PCT No.: PCT/FR2014/053266
§ 371 (c)(1),
(2) Date: Jun. 8, 2016

(87) PCT Pub. No.: WO2015/086999
PCT Pub. Date: Jun. 18, 2015

(65) Prior Publication Data
US 2017/0020331 A1    Jan. 26, 2017

(30) Foreign Application Priority Data

Dec. 12, 2013 (FR) ..................... 13 62522

(51) Int. Cl.
*B05D 3/02*    (2006.01)
*A47J 36/02*   (2006.01)
(Continued)

(52) U.S. Cl.
CPC .............. *A47J 36/02* (2013.01); *B05D 1/322* (2013.01); *B05D 3/0254* (2013.01); *B05D 7/542* (2013.01);
(Continued)

(58) Field of Classification Search
CPC ....... A47J 36/02; B05D 1/322; B05D 3/0254; B05D 7/542
See application file for complete search history.

(56) References Cited

U.S. PATENT DOCUMENTS 8,227,072 B2    7/2012 Le Bris et al.
2007/0017402 A1* 1/2007 Jordens ............... C09D 183/04
                                                       101/491
(Continued)

FOREIGN PATENT DOCUMENTS

EP     1835002 A2    9/2007
EP     2412846 A1    2/2012
(Continued)

*Primary Examiner* — Nathan H Empie
(74) *Attorney, Agent, or Firm* — Lerner, David, Littenberg, Krumholz & Mentlik, LLP

(57) ABSTRACT

Provided is a utensil including a support having two opposite faces, at least one of which is provided with a sol-gel coating including at least one sol-gel layer that is present in the form of a continuous film of a sol-gel material including a matrix of at least one metal polyalkoxylate. Said utensil additionally includes a hybrid sol-gel coating including at least one screen-printed sol-gel layer completely or partially covering said sol-gel coating, said first hybrid sol-gel layer consisting of a hybrid sol-gel material including a matrix formed from a first hybrid sol-gel composition including at least one silicone resin and at least one silane and/or at least one metal alkoxide. Also provided is a process for producing such a utensil.

5 Claims, 2 Drawing Sheets

(51) Int. Cl.
  *C09D 183/10*   (2006.01)
  *C09D 183/04*   (2006.01)
  *B05D 1/32*     (2006.01)
  *B05D 7/00*     (2006.01)
  *C25B 1/04*     (2006.01)
  C08G 77/445     (2006.01)

(52) U.S. Cl.
  CPC ......... *C09D 183/04* (2013.01); *C09D 183/10* (2013.01); *C25B 1/04* (2013.01); *C08G 77/445* (2013.01); *Y02E 60/366* (2013.01)

(56) References Cited

U.S. PATENT DOCUMENTS

| | | |
|---|---|---|
| 2007/0218297 A1 | 9/2007 | Jeon et al. |
| 2011/0192850 A1 | 8/2011 | Le Bris et al. |
| 2013/0266781 A1 | 10/2013 | Hoffmann et al. |
| 2015/0267079 A1* | 9/2015 | Bockmeyer ............. C03C 1/008 |
| | | 428/336 |

FOREIGN PATENT DOCUMENTS

| | | |
|---|---|---|
| EP | 2505619 A1 | 10/2012 |
| WO | 2010/023402 A1 | 3/2010 |

* cited by examiner

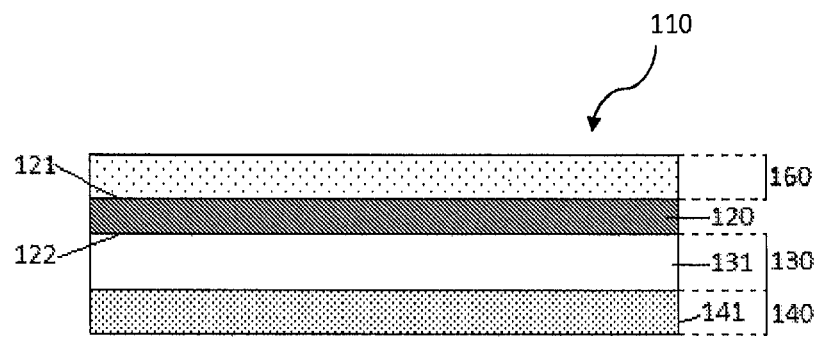
Fig. 1 - PRIOR ART
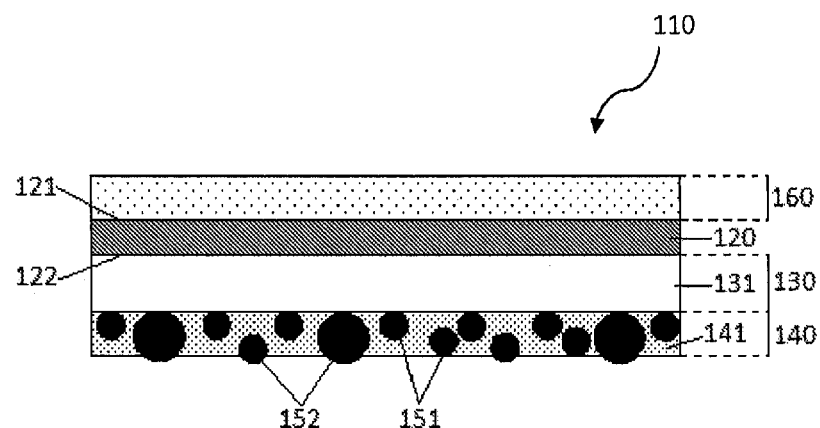
Fig. 2 - PRIOR ART

CULINARY UTENSIL PROVIDED WITH A HYBRID COATING AND PROCESS FOR PRODUCING SUCH A UTENSIL

CROSS-REFERENCE TO RELATED APPLICATIONS

This application is the United States national phase of International Application No. PCT/FR2014/053266 filed Dec. 11, 2014, and claims priority to French Patent Application No. 1362522 filed Dec. 12, 2013, the disclosures of which are hereby incorporated in their entirety by reference.

FIELD OF THE INVENTION

The present invention relates generally to a utensil of which at least one surface is equipped with a hybrid sol-gel coating. More specifically, the present invention relates to a culinary utensil of which the exterior surface is equipped, particularly at its base, with a hybrid sol-gel coating that is compatible with the use of a glass-ceramic or induction cooktop. The present invention also relates to the method of producing such utensils.

The term sol-gel process, in the context of the present invention, refers to the principle of synthesis involving the transformation of a solution of liquid phase precursors into a solid through a set of chemical reactions (hydrolysis and condensation) at low temperatures.

BACKGROUND OF THE INVENTION

The term sol-gel coating, in the context of the present invention, refers to a coating synthesized by a sol-gel process. The resulting coating may be either organo-mineral or entirely mineral.

The term hybrid sol-gel coating, in the context of the present invention, refers to a coating that comprises a hybrid sol-gel material involving a matrix structure created via a sol-gel process from a silicone resin alone or combined with a silane and/or metal alkoxide.

Sol-gel coating compositions are known to be particularly fluid and thus not suitable for serigraphy applications. Such compositions furthermore do not support the suspension of any dense load (metals, for example) in the formulation.

To address these problems, the applicant has developed a method of producing a hybrid sol-gel coating on a substrate, for which the nature of the hybrid sol-gel composition is adapted such that it may be applied to the substrate by serigraphy.

A known solution that enables the screen printing application of a metal alkoxide sol-gel composition consists of modifying the rheology of the composition. Thus, patent EP 2505619 discloses a method of producing a sol-gel coating in which the sol-gel composition's application phase can be achieved by serigraphy due to the addition of cellulose to the sol-gel composition and due to the replacement of the alcohol generated during the hydrolysis-condensation phase of one or more metal alkoxide precursors of the sol-gel composition by a heavier solvent such as a glycol. The viscosity of the sol-gel composition is thus modified during its synthesis. This modification of the viscosity of the sol-gel furthermore allows for the incorporation of dense beads (such as metal beads) in the composition, by allowing for their suspension in the composition and slowing, or even stopping their sedimentation in the composition.

However, the method of producing a sol-gel coating as described in EP 2505619 is complex (and thus costly) and difficult to integrate into a production workflow. In fact, it requires a supplemental solvent exchange step. Furthermore, for use as an exterior coating for culinary utensils, such a coating requires the introduction of metal beads that protrude from the sol-gel coating distributed homogenously over its surface. In fact, it is known to the skilled artisan that sol-gel coatings, and in particular those developed under alkaline conditions exhibit high hardness, which is a major drawback when the coated utensil is to be used on glass-ceramic cooktops: the friction of the sol-gel coating against the cooktop is a glass on glass friction, leading to the appearance of scratches that are very damaging not only to the aesthetics, but also, and particularly to the proper functioning of the cooktop.

SUMMARY OF THE INVENTION

The present invention is thus intended to offer the consumer a utensil, particularly a culinary utensil, for which at least one surface, and particularly the exterior surface, is equipped with a hybrid sol-gel coating, that is compatible with the use of a glass-ceramic or induction cooktop, which does not require the integration of beads, and which may be obtained via a simple, cost efficient method that is also easily integrated into a production workflow.

More specifically, the present invention relates to an utensil having a support with two opposing surfaces, at least one of which is equipped with a sol-gel coating comprising at least one sol-gel layer taking the form of a continuous film of a sol-gel material comprising a matrix of at least one metal polyalkoxylate, characterized in that the utensil according to the invention furthermore entails a hybrid sol-gel coating comprising at least one first screen-printed hybrid sol-gel layer that completely or partially covers said sol-gel coating, said first hybrid sol-gel layer being comprised of a hybrid sol-gel material incorporating a matrix formed from an initial hybrid sol-gel composition comprised of at least one silicone resin (or polysiloxane) and at least one silane and/or at least one metal alkoxide.

The hybrid sol-gel coating according to the invention is advantageous in that it does not scratch glass-ceramic cooktops, does not require the inclusion of beads and yet maintains a shiny, smooth surface and good heat resistance, making it particularly suitable for decorating the exterior bottom surfaces of culinary utensils.

Advantageously, the silicone resin accounts for 40 to 70% by weight of the total weight of said first hybrid sol-gel composition.

In terms of the silicone resin used in the context of the present invention, the silicone resin marketed by WACKER under the name SILRES® 610 is particularly noteworthy.

Advantageously, the silicone resin is a silicone polyester resin.

In terms of the silicone polyester resin used in the context of the present invention, the silicone polyester resins marketed by TEGO under the name SILIKOFTAL® are particularly noteworthy.

Advantageously, the first hybrid sol-gel layer is partially covered by a second discontinuous hybrid sol-gel layer applied by serigraphy, which also constitutes a hybrid sol-gel material comprising a matrix formed from a second hybrid sol-gel composition consisting of at least one silicone resin (preferably a silicone polyester resin) as previously specified and at least one silane and/or at least one metal alkoxide.

Advantageously, the silicone resin accounts for 40 to 70% by weight of the total weight of said second hybrid sol-gel composition.

The term metal alkoxide, in the context of the present invention, refers to a material of the $R_iMX_{(n-i)}$ group, in which:

M is a metal or transition metal, and for example, Al, Ce, Zr, Ti, Sn, V, Nb, Hf, Mg or a lanthanide.

n corresponds to the valence of the metal or transition metal M

X is a hydrolysable group, where $X_i$, may be identical or different;

R is an alkyl, phenyl, or organo-functional group, where $R_i$, may be identical or different, and i=0, 1, . . . or n−1.

Advantageously, the metal alkoxide is selected from titanium isopropoxide (TTIP) and zirconium isopropoxide.

The term silane, in the context of the present invention, refers to a material of the $R_iSiX_{(4-i)}$ group, in which:

X is a hydrolysable group, where $X_i$, may be identical or different;

R is an alkyl, phenyl, or organo-functional group, where $R_i$, may be identical or different, and i=0, 1, 2 or 3.

Advantageously, the silane is selected from methyltriethoxysilane (MTES), tetraethoxysilane (TEOS), (3-aminopropyl)triethoxysilane (APTES) and mixtures thereof.

Advantageously, the hybrid sol-gel material of the first hybrid sol-gel layer, and/or the second hybrid sol-gel layer where applicable may furthermore consist of at least one pigment load and/or at least one reinforcement load.

In terms of the pigment loads used in the context of the present invention, noteworthy variants include mica, coated or uncoated, titanium dioxide, mixed-oxides (spinels), aluminosilicates, iron oxides, carbon black, perylene red, metallic flakes, thermochromatic pigments and dyes, and mixtures thereof.

The primary purpose of these pigment loads is to provide color, and secondly to improve heat diffusion, increase the hardness (and durability) of the coating and to serve a lubricating function.

The term reinforcement loads, in the context of the present invention, refers to loads used to limit or eliminate scratching of glass-ceramic or induction cooktop surfaces by the coating according to the invention. In other words, these reinforcement loads make it possible to improve the capacity of the coating according to the invention to prevent the scratching of glass-ceramic or induction cooktop surfaces.

The reinforcement load used in accordance with the invention may advantageously include metal beads. Preferably, a portion of said metal beads protrude from the hybrid sol-gel coating, with the protruding beads distributed homogenously over the surface of said coating.

The term beads, in the context of the present invention, refers to loads taking a rounded, essentially spherical form.

The beads that are flush with the surface of the hybrid sol-gel coating according to the invention are intended to minimize contact with the glass-ceramic or induction cooktop by creating a ball bearing effect.

To achieve such an effect, the surface density of the metal beads protruding from said hybrid sol-gel coating may advantageously range from 50-300 loads/mm².

Below a surface density of 50 loads/mm², the weight distribution of the hybrid sol-gel according to the invention cannot be uniform. Above a surface density of 300 loads/mm², the resistance to thermal shock and gloss of the hybrid sol-gel coating according to the invention are both diminished.

Preferably, the surface density of the beads protruding from said hybrid sol-gel coating falls between 100 and 250 loads/mm². Within this range, both the ease of application and the ball bearing effect are maintained.

The beads serving as the reinforcement load may be different in nature, for example, made of glass or metal (or a metal alloy).

Advantageously, in the context of the present invention, stainless steel beads are used, such as those marketed by HOGANAS under the name 316 HIC 15 μm.

When the "reinforcing" beads are present in the hybrid sol-gel coating, their quantity and granulometry are crucial factors as they must be flush with the coating surface without altering its appearance and while preserving its homogeneity.

The quantity of beads may advantageously range from 0.01 to 40%, and preferably from 0.01 to 5% by weight of the total weight of each hybrid sol-gel layer of the hybrid sol-gel coating after cooking.

Under 0.01%, the beads have a negligible effect on the properties of the hybrid sol-gel layer as this quantity is not sufficient to prevent the sol-gel surface from scratching the glass-ceramic cooktop upon contact, whereas above 5%, the adhesion of the beads to the hybrid sol-gel layer according to the invention may be altered.

In terms of the granulometry of the beads, their diameter falls preferably between 5 to 30 μm, with the preferable average diameter between 15 to 20 μm, whereas the thickness of the first hybrid sol-gel layer and the second hybrid sol-gel layer, where applicable, falls between 5 to 20 μm, such that a portion of the beads projects beyond the surface of the hybrid sol-gel coating. All of the beads, applied to a thickness that is at least equal to their diameter, are perfectly anchored into the hybrid sol-gel coating.

The utensil according to the invention may advantageously be a culinary utensil having a support with an interior surface designed to receive food and an exterior surface designed to come into contact with a heat source, said exterior surface being coated with the sol-gel coating and hybrid sol-gel coating as defined above.

Advantageously, the sol-gel coating covers the entire exterior surface of the culinary utensil's support, while the hybrid sol-gel coating is applied only to the exterior surface corresponding to the base of the utensil.

The support material selected for use in the context of the present invention may advantageously be a metal, glass, plastic or ceramic.

In terms of the metal supports to be used in the context of the present invention, noteworthy variants include single-layer aluminum or aluminum alloy supports, or supports made of cast aluminum, stainless steel, cast steel or copper, or multi-layer supports constructed from the exterior to the interior of the following layers: ferritic stainless steel/aluminum/austenitic stainless steel, or even a cap of cast aluminum, aluminum or an aluminum alloy reinforced with a stainless steel exterior.

The present invention furthermore relates to a method for producing such a utensil as defined above, said method involving the following steps:

a) the provision of a support having at least two opposite surfaces;

b) the preparation of a sol-gel composition comprising b1) the preparation of an aqueous sol-gel composition consisting of at least one metal alkoxide sol-gel precursor, b2) the hydrolysis of said sol-gel precursor via the introduction of water and an acid or base catalyst, and finally b3) a condensation reaction resulting in the formation of an alcohol to produce the sol-gel composition;

c) the preparation of a hybrid sol-gel composition comprising c1) the preparation of a mixture comprising, in a solvent medium, at least one silicone resin and at least one silane and/or at least one metal alkoxide, and c2) a condensation reaction to produce the hybrid sol-gel composition;

d) the application onto at least one of the support surfaces of at least one layer of the sol-gel composition resulting from step b) to create a sol-gel coating consisting of at least one sol-gel layer in the form of a continuous film;

e) the partial or continuous serigraphy application of at least one layer of the hybrid sol-gel composition resulting from step c) onto said sol-gel coating to form an initial hybrid serigraphic sol-gel layer; and finally f) the cooking of the same at a temperature between 150° C. and 350° C.

The method according to the invention is simple and easily integrated into production workflows.

The silicone resin, silane and metal alkoxide used in the hybrid sol-gel composition are those previously defined.

Similarly, the utensil and the support are those previously defined.

The support onto which the sol-gel coating and hybrid sol-gel coating according to the invention are applied may be:

either a support taking the final form of the utensil, and in particular, in the case of a culinary utensil, having an interior surface designed to receive food and an exterior surface designed to come into contact with a heat source, or a disc (thus, essentially flat) that is, prior to the application of said coatings according to the invention, shaped, for example by cold forming, into a dome, then cut.

In one particular variant of the method according to the invention, the support takes the form of a disc and the method further involves a support forming step prior to step d) wherein the sol-gel composition is applied.

In an advantageous variant of the method according to the invention, the support surface to be coated may undergo a degreasing process, sandblasting process and a specific surface treatment intended to improve the adhesion of the sol-gel coating to the support surface.

In an advantageous variant of the method according to the invention, the surface of the sol-gel coating applied in step d) may undergo a specific surface treatment prior to the application of the hybrid sol-gel composition in step e) intended to improve the adhesion of the hybrid sol-gel coating to the sol-gel coating.

Advantageously, a cold plasma surface treatment can be used to treat the surface of the sol-gel coating according to the invention.

The cold plasma surface treatment may advantageously be used with ammonia plasma. Should the hybrid sol-gel coating include a silicone polyester resin, the surface amino groups created by the ammonia plasma may react with the free functional groups remaining from the polyester in the resin when the first hybrid sol-gel layer was applied.

Another possible cold plasma surface treatment variant would be to use a plasma ($N_2/H_2$) that would create –N groups on the surface of the sol-gel coating to form silazane (Si—N) bonds between the sol-gel coating and the first hybrid sol-gel layer.

In one variant of the method according to the invention, to improve adhesion between the hybrid sol-gel coating and the sol-gel coating, a coupling agent may be used, for example, an aminosilane such as (3-aminopropyl)triethoxysilane (APTES), which one may either:

incorporate directly into the hybrid sol-gel composition consisting of a silicone polyester resin (to bind itself to the polyester in the resin, the silane component is then free to react via condensation with the hydroxyls on the surface of the sol-gel coating) in the preparation of step c), or deposit on the sol-gel coating in the presence of anhydrous toluene prior to the application process described in step e).

Step b) in the preparation of the sol-gel composition is carried out in the conventional manner, for example, as described in patent document FR 2973390.

Preferably, for the preparation b1) of the aqueous sol-gel composition, the metal alkoxide precursor is selected from:

precursors with the general formula $M_1(OR_1)_n$, precursors with the general formula $M_2(OR_2)_{(n-1)}R_2'$, and precursors with the general formula $M_3(OR_3)_{(n-2)}R_3'_2$, with:

$R_1$, $R_2$, $R_3$ or $R_3'$ representing an alkyl group, $R_2'$ representing an alkyl or phenyl group, n being a whole number corresponding to the maximum valence of metals $M_1$, $M_2$, $M_3$, and $M_1$, $M_2$, or $M_3$ corresponding to a metal, transition metal or nonmetal selected from Si, Zr, Ti, Sn, Al, Ce, V, Nb, Hf, Mg or a lanthanide.

Advantageously, the metal alkoxide of the aqueous sol-gel composition of step b1) is an alkoxysilane.

In terms of alkoxysilanes that can be used in the aqueous sol-gel composition of step b1) of the method of the invention, noteworthy variants include methyltrimethoxysilane (MTMS), tetraethoxysilane (TEOS), methyltriethoxysilane (MTES), dimethoxydimethylsilane, and mixtures thereof.

Preferably, the alkoxysilanes MTES and TEOS are used, as they advantageously contain no methoxy groups. In fact, the hydrolysis of methoxy groups leads to the formation of methanol in the sol-gel formulation, which requires additional precautions in the application phase because of its classification as a toxin. On the contrary, the hydrolysis of ethoxy groups only generates ethanol, which benefits from a more favorable classification and is therefore subject to less stringent regulations regarding its use as a sol-gel coating.

The solvent medium used in the preparation of step c1) may advantageously comprise at least one light organic solvent used as a diluent and at least one heavy organic solvent used as a humectant.

These solvents (both light and heavy) prevent the hybrid sol-gel composition (or, "serigraph ink") from drying on the serigraphy screen (due to the action of the heavy solvent) and also accelerate the surface drying time of the composition to facilitate multi-layer serigraphy (due to the rapid evaporation of the light solvent).

The heavy solvents used in the hybrid sol-gel composition according to the invention may advantageously be selected from the polyols (and in particular, diols, ester diols, ether diols or polyphenols) or terpene derivatives (terpineol, for example). The heavy organic solvents according to the invention typically have a high molecular mass (greater than or equal to 100 g·mol$^{-1}$) and a high boiling point (particularly greater than or equal to 150° C.).

The light solvents used in the hybrid sol-gel composition according to the invention may advantageously be selected from the polar solvents with a boiling point less than or equal to 150° C.

Preferably, xylene is used as the light solvent because it is already present in the silicone polyester resin. It is also soluble in esters, ketones and glycol ethers.

When the hybrid sol-gel composition contains a silane, said silane will preferably have been pre-hydrolyzed.

When the hybrid sol-gel composition contains a metal alkoxide, said metal alkoxide will preferably have been prehydrolyzed in the presence of water and an acid, such as formic acid or acetic acid.

Advantageously, prior to the step in which the metal alkoxide is hydrolyzed, there may be a chelation of the metal alkoxide using a chelating agent such as acetylacetone (ACAC) or ethyl acetoacetate (EAA).

Furthermore, when the hybrid sol-gel composition contains both a silane and a metal alkoxide, at least one of the silane and the metal alkoxide will preferably have been pre-hydrolyzed.

The method according to the invention may advantageously include, immediately after step c), a step c') to adjust the viscosity of the hybrid sol-gel composition to a value ranging from 0.2 Pa·s to 5 Pa·s (2 to 50 Poise), and preferably to a value ranging from 0.5 Pa·s to 2 Pa·s (5 to 20 Poise).

For this, the hybrid sol-gel composition may advantageously be thickened with a cellulose, modified or not, and preferably an ethyl cellulose (for example, Dow Ethocel STD300®), in order to increase the viscosity so as to facilitate the application by serigraphy.

The addition to the hybrid sol-gel composition of other organic thickeners of various natures, such as xanthan gum or clays (for example, Bentone SDC-2), or even thixotropic rheology additives such as modified urea, to adjust the rheology of the hybrid sol-gel composition as desired is conceivable.

It is furthermore also possible to add at least one pigment load and/or at least one reinforcing load to the hybrid sol-gel composition, immediately after preparation step c).

The pigment load(s) and/or reinforcing load(s) are those previously defined.

The aqueous sol-gel composition may be applied in a single layer or multiple layers to the sol-gel coating.

The application of the sol-gel composition in step d) may be accomplished using any technique known to the skilled artisan. For example, the application of the sol-gel composition may be carried out via spraying, soaking, dip coating, or spin coating the sol-gel composition onto the support surface to be coated.

Advantageously, step d) of the sol-gel composition application may furthermore include the drying of the sol-gel coating, for example using infrared light at a temperature ranging from 50° C. to 100° C.

In application step e), the hybrid sol-gel composition is advantageously applied by means of serigraphy onto the sol-gel coating resulting from step d). The hybrid sol-gel composition may be applied in a single layer or in multiple layers.

Advantageously, step e) may furthermore include the drying of the hybrid sol-gel coating, for example using infrared light at a temperature ranging from 50 CC to 100° C.

The cooking step f) may advantageously be carried out in a classical convection oven in a classical atmosphere, whether inert or oxidant.

Preferably, cooking step f) is carried out at a temperature ranging from 200° C. to 300° C.

BRIEF DESCRIPTION OF THE INVENTION

Other advantages and particularities of the present invention will result from the following description, provided by way of example and therefore non-limiting, and referencing the examples in the annexed corresponding figures:

FIG. 1 is a schematic cross-sectional view of a culinary utensil according to one embodiment of prior art;

FIG. 2 is a schematic cross-sectional view of a culinary utensil according to another embodiment of prior art;

DETAILED DESCRIPTION OF THE INVENTION

Figure 3:
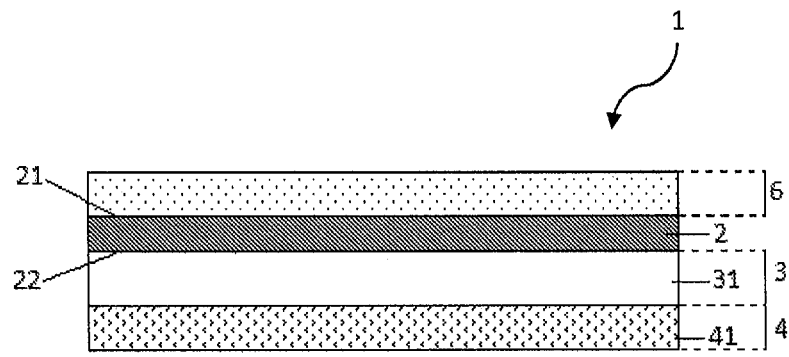
FIG. 3 is a schematic cross-sectional view of a culinary utensil consistent with the present invention according to a first embodiment variant.
Figure 4:
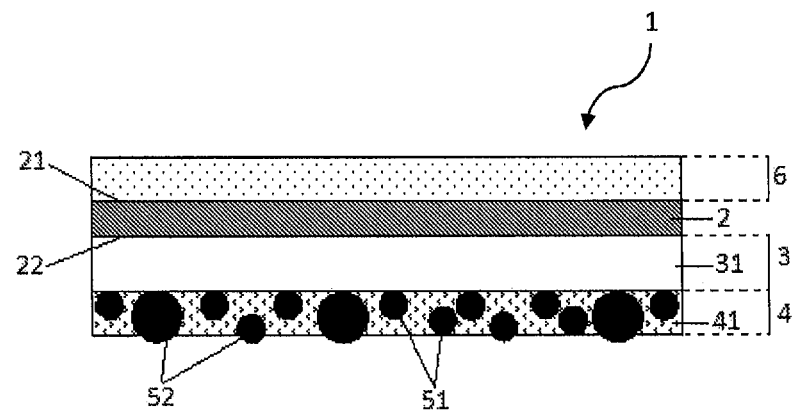
FIG. 4 is a schematic cross-sectional view of a culinary utensil consistent with the present invention according to a second embodiment variant.
Figure 5:
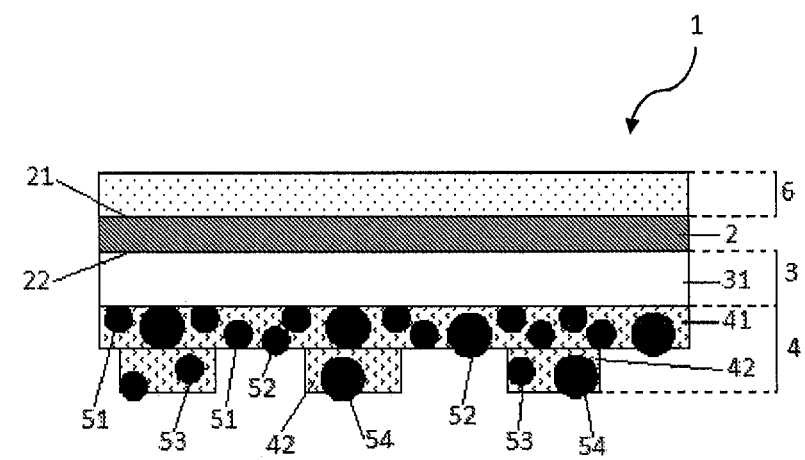
FIG. 5 is a schematic cross-sectional view of a culinary utensil consistent with the present invention according to a third embodiment variant.

The identical elements represented in FIGS. 1 and 2, and in FIGS. 3 through 5 respectively are identified by the same reference numbers.

FIG. 1 (corresponding to the conditions of Comparative Example 3) is a cross-sectional view of a culinary utensil (110) according to one embodiment of prior art. Said culinary utensil (110) consists of an aluminum support (120) with two opposite surfaces (121) (interior surface) and (122) (exterior surface). The interior surface (121) is coated with an anti-adhesive coating (160), for example a coating made of fluorocarbon resin, enamel or a sol-gel material.

The exterior surface (122) is covered with a first sol-gel coating (130) comprising a sol-gel layer (131) in the form of a continuous film of a sol-gel material comprising a matrix of at least one metal polyalkoxylate. Then, the first sol-gel coating (130) is covered by a second sol-gel coating (140) comprising a sol-gel layer (141) in accordance with the instructions provided in Example 13 of patent document U.S. Pat. No. 6,863,923.

FIG. 2 (corresponding to the conditions of Comparative Example 4) is a cross-sectional view of a culinary utensil (110) according to a second embodiment of prior art. Said culinary utensil (110) consists of an aluminum support (120) with two opposite surfaces (121) (interior surface) and (122) (exterior surface). The interior surface (121) is coated with an anti-adhesive coating (160), for example a coating made of fluorocarbon resin, enamel or a sol-gel material.

The exterior surface (122) is covered with a first sol-gel coating (130) comprising a sol-gel layer (131) in the form of a continuous film of a sol-gel material comprising a matrix of at least one metal polyalkoxylate. Then, the first sol-gel coating (130) is covered, using serigraphy, by a second sol-gel coating (140) comprising a sol-gel layer (141) in accordance with the instructions provided in patent document FR 2973390 that incorporates stainless steel beads (151, 152), a portion of which (152) protrude beyond the surface of the second sol-gel coating (140).

The utensil illustrated in the annexed FIG. 3 is a culinary utensil 1 according to a first embodiment of the invention. The culinary utensil (1) illustrated in FIG. 3 corresponds to the conditions in examples 2 and 7.

This culinary utensil (1) consists of an aluminum support (2) with two opposite surfaces (21) (interior surface) and (22) (exterior surface). The interior surface (21) is coated with an anti-adhesive coating (6), for example a coating made of fluorocarbon resin, enamel or a sol-gel material.

The exterior surface (22) is covered with a sol-gel coating (3) comprising a sol-gel layer (31) in the form of a continuous film of a sol-gel material comprising a matrix of at least one metal polyalkoxylate. Finally, the sol-gel coating (3) is covered, with serigraphy, by a hybrid sol-gel coating (4) comprising a hybrid sol-gel layer (41) according to the present invention.

The utensil illustrated in the annexed FIG. 4 is a culinary utensil (1) according to a second embodiment of the invention. The culinary utensil (1) illustrated in FIG. 3 corresponds to the conditions in examples 3, 5, 6, and 8 through 10.

In the embodiment illustrated in FIG. 4, the hybrid sol-gel layer (41) of the hybrid sol-gel coating (4) comprises metal beads (51, 52) of which a portion (52) protrude beyond the surface of this hybrid sol-gel layer (41).

The utensil illustrated in the annexed FIG. 5 is a culinary utensil (1) according to a third embodiment of the invention.

In the embodiment illustrated in FIG. 5, the hybrid sol-gel coating (4) comprises two hybrid sol-gel layers (41, 42). The first hybrid sol-gel layer (41) is applied continuously with serigraphy onto the sol-gel coating (3). The second hybrid sol-gel layer (42) is applied discontinuously with serigraphy onto the first hybrid sol-gel layer (41). These two hybrid sol-gel layers (41, 42) comprise metal beads (51, 52, 53, 54) of which a portion (52, 54) protrude beyond the surface of the hybrid sol-gel layers, (41, 42) respectively.

EXAMPLES

In these examples, except as indicated, all percentages and proportions are expressed by weight.

Tests

Flame Resistance:

The coatings prepared in the following examples were exposed to the flame of a Bunsen burner for 20 seconds, then quench cooled in cold water. Following the flaming, the general appearance of each coating was assessed. Particular note was taken of any traces of oxidation (typically white/brown) or carbonization (typically black).

Adhesion Test (Based on the Test in Standard EN 10209):

The Erichsen test standard EN 10209 related to enameling was applied to sol-gel coatings prepared in the examples below. An ogive propelled by potential energy is used to strike the surface of each coating. Following the test, the residual adhesion of each coating to its metal support was evaluated.

Abrasion Test (Based on the Test in Standard NFD 21-511):

The abrasion resistance of the sol-gel type coatings prepared in the following examples was assessed by subjecting each coating to the action of a green SCOTCH BRITE® or similar scouring pad. The abrasion resistance of each coating was qualitatively estimated with respect to the number of times the scouring pad had to be passed across the surface to create the first scratch (meaning the metal material forming the support could be seen).

Scratch Test with Glass-Ceramic Cooktop:

This test is designed to characterize the non-deterioration of glass-ceramic cooktops. It makes it possible to verify that a pan will not scratch the cooktop (test conducted on a cold cooktop). This test is intended for culinary utensils to be used with glass-ceramic and induction surfaces. The equipment used includes a pan, a clean and unscratched glass-ceramic cooktop, and a 100 gram weight.

The 100 g weight is placed in the center of the pan, while the pan is positioned on the glass-ceramic cooktop. The pan is then moved horizontally over the glass-ceramic cooktop from A to B to C (see figure above) for 10 cycles.

The condition of the glass-ceramic cooktop is then assessed and the presence of any scratches noted where applicable.

Gloss (DIN EN ISO 2813)

Use of a gloss meter (for example, the BYK Gardner® Micro tri gloss) that is applied to the surface of an article and that emits a flash of light at a 60° angle (other angles possible, 20° and 85°) to define surface reflection. Based on a scale of 100 GU (=gloss units measured against a black glass polished to the standard refractive index) where the resulting measurement is proportional to the refractive index of the surface (thus a measurement >100 GU is possible).

Examples Produced (Compositions and Experimental Conditions)

Example 1

Preparation of a Sol-Gel Coating on a Support

A sol-gel composition SG1 of metal alkoxide precursors was prepared according to the composition specified below in Table 1.

This composition SG1 was applied by spraying onto the aluminum supports to form, on each, a sol-gel coating.

TABLE 1

| Components | Mass fraction (%) |
|---|---|
| Sol-gel precursor with the general formula $M_2(OR_2)_{(n-1)}R_2'$ | 80 to 97% |
| Sol-gel precursor with the general formula $M_3(OR_3)_{(n-2)}R_3'_2$ | 0 to 20% |
| Acid or basic catalyst | 0.1 to 5% |
| Water | 1 to 10% |
| Chelating agent (for example, an alcohol) | 0 to 10% |

Example 2

Hybrid Sol-Gel Composition According to the Invention, with Silanes but No Reinforcing Beads A hybrid sol-gel composition SGH1 according to the invention, containing a silicone resin and a silane but no reinforcing beads, was prepared according to the composition specified below in Table 2.

This composition SGH1 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 2

| Components | Mass fraction (%) |
|---|---|
| Silicone resin: SILRES ® 610 resin marketed by WACKER | 40 to 70% |
| Silane: aminopropylsilane | 5 to 20% |
| Solvents: xylene and butyl acetate (80/20) | 5 to 20% |
| Load: alumina | 5 to 20% |
| Mineral pigments: iron oxide, FeCrCu oxide | 5 to 20% |
| Cellulosic rheology additive | 0 to 5% |

Example 3

Hybrid Sol-Gel Composition According to the Invention, with Silanes and Reinforcing Beads A hybrid sol-gel composition SGH2 according to the invention, containing a silicone resin, reinforcing beads and a silane, prepared according to the composition specified below in Table 3.

The reinforcing beads used were stainless steel beads marketed by HOGANAS under the name 316 HIC 15 µm.

This composition SGH2 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 3

| Components | Mass fraction (%) |
|---|---|
| Silicone resin: SILRES ® 610 resin marketed by WACKER | 40 to 70% |
| Silane: aminopropylsilane | 5 to 20% |
| Solvents: xylene and butyl acetate (80/20) | 5 to 20% |
| Load: alumina | 5 to 20% |
| Mineral pigments: iron oxide, FeCrCu oxide | 5 to 20% |
| Stainless steel beads | 2 to 5% |
| Cellulosic rheology additive | 0 to 5% |

Example 4

Chelation and Pre-Hydrolysis of a Metal Alkoxide

A composition comprising a metal alkoxide was prepared according to the composition specified below in Table 4 for the purposes of chelating and pre-hydrolyzing said metal alkoxide.

TABLE 4

| Components | Mass fraction (%) |
|---|---|
| Chelating agent: acetylacetonate CAS 123-54-6 | 5 to 20% |
| Metal alkoxide: titanium isopropoxide CAS 548-68-9 | 40 to 60% |
| Water | 15 to 30% |
| Acetic acid | 1 to 6% |

Example 5

Hybrid Sol-Gel Composition According to the Invention, with Metal Alkoxides and Reinforcing Beads A hybrid sol-gel composition SGH3 according to the invention, containing a silicone resin, reinforcing beads and the prehydrolyzed metal alkoxide from Example 4, was prepared according to the composition specified below in Table 5.

The reinforcing beads used were stainless steel beads marketed by HOGANAS under the name 316 HIC 15 µm.

This composition SGH3 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 5

| Components | Mass fraction (%) |
|---|---|
| Silicone resin: SILRES ® 610 resin marketed by WACKER | 40 to 70% |
| Metal alkoxide: prehydrolyzed titanium isopropoxide CAS 548-68-9 (example 4) | 5 to 25% |
| Solvent: butyl glycol | 5 to 20% |
| Load: alumina | 5 to 20% |
| Mineral pigments: iron oxide, FeCrCu oxide | 5 to 20% |
| Stainless steel beads | 2 to 15% |

Example 6

Hybrid Sol-Gel Composition According to the Invention, with Silanes, Metal Alkoxides and Reinforcing Beads A hybrid sol-gel composition SGH4 according to the invention, containing a silicone resin, reinforcing beads as well as a silane and the prehydrolyzed metal alkoxide from Example 4, was prepared according to the composition specified below in Table 6.

The reinforcing beads used were stainless steel beads marketed by HOGANAS under the name 316 HIC 15 µm.

This composition SGH4 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 6

| Components | Mass fraction (%) |
|---|---|
| Silicone resin: SILRES ® 610 resin marketed by WACKER | 40 to 70% |
| Metal alkoxide: prehydrolyzed titanium isopropoxide CAS 548-68-9 (example 4) | 1 to 15% |
| Silane: 3-aminopropyltriethoxysilane | 1 to 15% |
| Solvent: butyl glycol | 5 to 20% |
| Load: alumina | 5 to 20% |
| Mineral pigments: iron oxide, FeCrCu oxide | 5 to 20% |
| Stainless steel beads | 2 to 15% |

Example 7

Hybrid Sol-Gel Composition According to the Invention, with Silanes but No Reinforcing Beads A hybrid sol-gel composition SGH5 according to the invention, containing a silicone polyester resin and a silane, but no reinforcing beads, was prepared according to the composition specified below in Table 7.

This composition SGH5 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 7

| Components | Mass fraction (%) |
| --- | --- |
| Silicone polyester resin: SILIKOFTAL ® resin marketed by TEGO | 40 to 70% |
| Silane: aminopropylsilane | 5 to 20% |
| Solvents: xylene and butyl acetate (80/20) | 5 to 20% |
| Load: alumina | 5 to 20% |
| Mineral pigments: iron oxide, FeCrCu oxide | 5 to 20% |
| Cellulosic rheology additive | 0 to 5% |

Example 8

Hybrid Sol-Gel Composition According to the Invention, with Silanes and Reinforcing Beads A hybrid sol-gel composition SGH6 according to the invention, containing a silicone polyester resin, reinforcing beads and a silane, was prepared according to the composition specified below in Table 8.

The reinforcing beads used were stainless steel beads marketed by HOGANAS under the name 316 HIC 15 µm.

This composition SGH6 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 8

| Components | Mass fraction (%) |
| --- | --- |
| Silicone polyester resin: SILIKOFTAL ® resin marketed by TEGO | 40 to 70% |
| Silane: aminopropylsilane | 5 to 20% |
| Solvents: xylene and butyl acetate (80/20) | 5 to 20% |
| Load: alumina | 5 to 20% |
| Mineral pigments: iron oxide, FeCrCu oxide | 5 to 20% |
| Stainless steel beads | 0 to 5% |
| Cellulosic rheology additive | 2 to 15% |

Example 9

Hybrid Sol-Gel Composition According to the Invention, with Metal Alkoxides and Reinforcing Beads A hybrid sol-gel composition SGH7, according to the invention, containing a silicone polyester resin, reinforcing beads and the prehydrolyzed metal alkoxide from Example 4, was prepared according to the composition specified below in Table 9.

The reinforcing beads used were stainless steel beads marketed by HOGANAS under the name 316 HIC 15 µm.

This composition SGH7 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 9

| Components | Mass fraction (%) |
| --- | --- |
| Silicone polyester resin: SILIKOFTAL ® resin marketed by TEGO | 40 to 70% |
| Metal alkoxide: prehydrolyzed titanium isopropoxide CAS 548-68-9 (Example 4) | 5 to 25% |
| Solvent: butyl glycol | 5 to 20% |
| Load: alumina | 5 to 20% |
| Mineral pigments: iron oxide, FeCrCu oxide | 5 to 20% |
| Stainless steel beads | 2 to 15% |

Example 10

Hybrid Sol-Gel Composition According to the Invention, with Silanes, Metal Alkoxides and Reinforcing Beads A hybrid sol-gel composition SGH8, according to the invention, containing a silicone polyester resin, reinforcing beads as well as a silane and the prehydrolyzed metal alkoxide from Example 4, was prepared according to the composition specified below in Table 10.

The reinforcing beads used were stainless steel beads marketed by HOGANAS under the name 316 HIC 15 µm.

This composition SGH8 was applied in a single screen-printed layer to the sol-gel coating obtained in Example 1, to form a hybrid sol-gel coating comprising a hybrid sol-gel layer according to the invention.

The whole was cooked at a temperature between 200° C. and 300° C.

TABLE 10

| Components | Mass fraction (%) |
| --- | --- |
| Silicone polyester resin: SILIKOFTAL ® resin marketed by TEGO | 40 to 70% |
| Metal alkoxide: prehydrolyzed titanium isopropoxide CAS 548-68-9 (Example 4) | 1 to 15% |
| Silane: 3-aminopropyltriethoxysilane | 1 to 15% |
| Solvent: butyl glycol | 5 to 20% |
| Load: alumina | 5 to 20% |
| Mineral pigments: iron oxide, FeCrCu oxide | 5 to 20% |
| Stainless steel beads | 2 to 15% |

Comparative Example 1

Hybrid Sol-Gel Composition, with No Silanes, Metal Alkoxides or Reinforcing Beads A hybrid sol-gel composition SGHc1, containing a silicone resin but no silanes, metal alkoxides or reinforcing beads, was prepared according to the composition specified below in Table 11.

This composition SGHc1 was applied in a single screen-printed layer to the sol-gel coating obtained in Example 1, to form a hybrid sol-gel coating comprising a hybrid sol-gel layer.

The whole was cooked at a temperature between 200° C. and 300° C.

TABLE 11

| Components | Mass fraction (%) |
|---|---|
| Silicone resin: SILRES ® 610 resin marketed by WACKER | 40 to 70% |
| Solvents: xylene and butyl acetate (80/20) | 5 to 20% |
| Load: alumina | 5 to 20% |
| Mineral pigments: iron oxide, FeCrCu oxide | 5 to 20% |
| Cellulosic rheology additive | 0 to 5% |

Comparative Example 2

Hybrid Sol-Gel Composition, with No Silanes, Metal Alkoxides or Reinforcing Beads A hybrid sol-gel composition SGHc2, containing a silicone polyester resin but no silanes, metal alkoxides or reinforcing beads, was prepared according to the composition specified below in Table 12.

This composition SGHc2 was applied in a single screen-printed layer to the sol-gel coating obtained in Example 1, to form a hybrid sol-gel coating comprising a hybrid sol-gel layer.

The whole was cooked at a temperature between 200° C. and 300° C.

TABLE 12

| Components | Mass fraction (%) |
|---|---|
| Silicone polyester resin: SILIKOFTAL ® resin marketed by TEGO | 40 to 70% |
| Solvents: xylene and butyl acetate (80/20) | 5 to 20% |
| Load: alumina | 5 to 20% |
| Mineral pigments: iron oxide, FeCrCu oxide | 5 to 20% |
| Cellulosic rheology additive | 0 to 5% |

Comparative Example 3

A sol-gel composition SGc1 of metal alkoxide precursors that does not contain metal beads was prepared according to the composition specified in the patent document U.S. Pat. No. 6,863,923 as in Example 3.

This composition SGc1 was applied in a single screen-printed layer to the sol-gel coating obtained in Example 1, to form a sol-gel coating.

The whole was cooked at a temperature between 200° C. and 300° C.

Comparative Example 4

A screen-printed sol-gel composition SGc2 of metal alkoxide precursors containing stainless steel beads, was prepared according to the instructions of patent document FR 2973390, according to the composition specified below in Table 13.

This composition SGc2 was applied in a single screen-printed layer to the sol-gel coating obtained in Example 1, to form a sol-gel coating.

The whole was cooked at a temperature between 200° C. and 300° C.

TABLE 13

| Components | Mass fraction (%) |
|---|---|
| Resin or terpene derivatives | 20 to 50% |
| Modified sol-gel composition (cf. below) | 30 to 50% |
| Mineral pigments | 0 to 10% |
| Stainless steel spherical loads | 5 to 30% |

The modified sol-gel composition for the screen-printed SGc2 composition was obtained as follows:

As with the SG1 sol-gel composition, an initial sol-gel composition of a metal alkoxide precursor was prepared as previously defined;

This metal alkoxide was then hydrolyzed in a reactor in the presence of water and either an acid or a base (preferably sodium hydroxide, potassium alkalines and alkaline earth metals) followed by a condensation reaction yielding alcohol;

Filtration of the resulting sol-gel composition may be necessary if granules have formed during the hydrolysis-condensation reaction (for example, if agglomerates were formed in situ during the hydrolysis-condensation reaction of the metal alkoxide precursors, particularly if the reaction took place under alkaline conditions).

The alcohol created via the hydrolysis-condensation reaction was evaporated/distilled out of the sol-gel composition (aided by vacuum evacuation) and was then replaced with a glycol or terpene derivative (terpineol) to form the modified sol-gel composition.

The modified sol-gel composition was then mixed with cellulose (Dow Ethocel STD 20®) to increase viscosity and facilitate the screen-printing application. A viscosity ranging from 0.5 to 5 Pa·s (5 to 50 poise) was targeted. The addition of other binders, such as a CMC-type organic binders or xanthan gum, may be used to modify the desired rheology of the serigraphy paste.

In a final step, the metal loads (Hoganas 316 HIC 15 µm) are added by dispersion to produce the SGc2 composition.

Results of Conducted Tests

The coated supports produced in Examples 2, 3, and 5 through 10 and in Comparative Examples 1 through 4 were tested for flame resistance, adhesion, abrasion, glass cooktop scratching and gloss, as described above. The results of these various tests are summarized in Table 14 below.

TABLE 14

| | (Results): | | | | | |
|---|---|---|---|---|---|---|
| Examples | Suitability for serigraphy | Adhesion | Flame | Abrasion | Glass cooktop scratch test | Gloss (in points at a 60° angle) |
| 2 SG1 + SGH1 | Acceptable | Acceptable | Good | Very good | Light scratching | 110 |

TABLE 14-continued (Results):

| Examples | Suitability for serigraphy | Adhesion | Flame | Abrasion | Glass cooktop scratch test | Gloss (in points at a 60° angle) |
|---|---|---|---|---|---|---|
| 3 SG1 + SGH2 | Acceptable | Acceptable | Good | Very good | Good | 80 |
| 5 SG1 + SGH3 | n/d | Very good | n/d | Good | Good | 60 |
| 6 SG1 + SGH4 | n/d | Very good | n/d | Good | Good | 80 |
| 7 SG1 + SGH5 | Excellent | Very good | Good | Very good | Light scratching | 100 |
| 8 SG1 + SGH6 | Excellent | Very good | Good | Good | Good | 80 |
| 9 SG1 + SGH7 | n/d | Very good | n/d | Good | Good | 60 |
| 10 SG1 + SGH8 | n/d | Very good | n/d | Good | Good | 80 |
| Comparison 1 SG1 + SGHc1 | Acceptable | Acceptable | Good | Good | Some scratching | 110 |
| Comparison 2 SG1 + SGHc2 | Excellent | Good | Good | Good | Some scratching | 110 |
| Comparison 3 SG1 + SGc1 | Excellent | Excellent | Excellent | Not good | Scratching | 15 |
| Comparison 4 SG1 + SGc2 | Excellent | Excellent | Excellent | Scratch | Good | 15 |

The results in Table 14 show that the hybrid sol-gel coatings according to the invention (Examples 2, 3, and 5 through 10) may be applied by serigraphy and globally have acceptable adhesion to the underlying sol-gel coating. Their flame resistance properties are equally good. However, unlike traditional sol-gels made with metal alkoxide precursors (Comparative Examples 3 and 4), they are resistant to abrasion and may therefore be used on glass-ceramic cooktops, even without necessarily adding metal beads (cf. Examples 2 and 7).

The comparisons of Example 2 with Comparative Example 1 (simple silicone resin) and Example 7 with Comparative Example 2 (silicone polyester resin) demonstrate that the addition of silane to the hybrid coating composition improves resistance to abrasion.

The comparisons of Examples 2 and 3 (simple silicone resin with silanes) with Examples 7 and 8 (silicone polyester resin with silanes) demonstrate that the addition of reinforcing beads to the hybrid sol-gel coating composition that already contains silanes further improves resistance to abrasion.

The comparison of Example 2 (simple silicone resin) to Example 7 (silicone polyester resin) demonstrates that switching from a simple silicone resin to a silicone polyester resin further improves suitability for serigraphy.

The invention claimed is:

1. Method for producing a utensil said method comprising the following steps:
   a) providing a metallic support having at least two opposite surfaces;
   b) preparing a sol-gel composition comprising b1) the preparation of an aqueous sol-gel composition consisting of at least one metal alkoxide sol-gel precursor, b2) the hydrolysis of said sol-gel precursor in the presence of water and an acid or base catalyst, and finally b3) a condensation reaction resulting in the formation of an alcohol to produce the sol-gel composition;
   c) preparing a hybrid sol-gel composition comprising c1) the preparation of a mixture comprising, in a solvent medium, at least one silicone resin and at least one silane and/or at least one metal alkoxide, in which the solvent medium comprises at least one light organic solvent used as a diluent and at least one heavy organic solvent used as a humectant, wherein the light solvent has a boiling point of less than or equal to 150° C., and the heavy solvent has a molecular mass of greater than or equal to 100 g·mol$^{-1}$ and a boiling point of greater than or equal to 150° C., and c2) a condensation reaction to produce the hybrid sol-gel composition;
   d) applying onto at least one of the support surfaces of at least one layer of the sol-gel composition resulting from step b) to create a sol-gel coating consisting of at least one sol-gel layer in the form of a continuous film;
   e) applying by partial or continuous serigraphy onto said coating of at least one layer of the hybrid sol-gel composition resulting from step c) to form an initial hybrid serigraphic sol-gel layer; and finally
   f) heating the applied coatings of steps d) and e) at a temperature between 150° C. and 350° C.
   wherein the hybrid sol-gel composition comprises from 40 to 70% by weight of the silicone resin based on the total weight of the hybrid sol-gel composition.

2. Method as in claim 1, in which the silane and/or metal alkoxide are pre-hydrolyzed.

3. Method as in claim 1, that further includes a step c') of adjusting a viscosity of the hybrid sol-gel composition to a value ranging from 0.2 Pa·s to 5 Pa·s, immediately following step c).

4. Method as in claim 3, wherein the step c') is carried out by the addition of a cellulose, whether modified or not.

5. Method as in claim 1, that further includes, immediately following step c) a step one of adding one or both of a pigment load and a reinforcing load to the hybrid sol-gel composition.

* * * * *